United States Patent [19]

Bannon et al.

[11] 3,958,603

[45] May 25, 1976

[54] INSERT FOR MOVABLE DIAPHRAGM TYPE FLOW CONTROL VALVE

[75] Inventors: John Bannon, Rowayton, Conn.;
  Steve Goldman, Monsey, N.Y.;
  Richard A. Lametto, Norwalk, Conn.

[73] Assignee: The Nash Engineering Company, Norwalk, Conn.

[22] Filed: Dec. 9, 1974

[21] Appl. No.: 530,568

Related U.S. Application Data

[63] Continuation of Ser. No. 359,811, May 14, 1973, abandoned.

[52] U.S. Cl. .................................... 138/43; 137/517
[51] Int. Cl.² ......................................... F16K 15/02
[58] Field of Search ............... 138/43, 46; 137/202, 137/516, 517, 513.5, 516.25, 516.27, 516.29, 528, 533, 533.17, 533.21, 533.25, 533.31, 543.21

[56] References Cited
UNITED STATES PATENTS

| | | |
|---|---|---|
| 1,077,415 | 11/1913 | Massey .......................... 137/533.25 |
| 1,604,487 | 10/1926 | Scovel, Jr. ...................... 137/543.21 |
| 1,661,266 | 3/1928 | Parshall .......................... 137/533 X |
| 1,776,060 | 9/1930 | Beckwith .................... 137/533.17 X |
| 2,677,939 | 5/1954 | Clute ............................. 137/202 X |
| 2,697,915 | 12/1954 | Chisholm .................. 137/543.21 X |
| 2,951,503 | 9/1960 | Windsor ...................... 137/528 UX |
| 3,189,125 | 6/1965 | Windsor et al. ..................... 138/43 |
| 3,200,831 | 8/1965 | Whitfield ................... 137/533.25 X |

FOREIGN PATENTS OR APPLICATIONS

| | | |
|---|---|---|
| 676,680 | 6/1939 | Germany ....................... 137/533.17 |
| 1,450,483 | 12/1968 | Germany ........................... 137/528 |
| 1,180,505 | 2/1970 | United Kingdom............ 137/533.17 |

*Primary Examiner*—Robert G. Nilson
*Attorney, Agent, or Firm*—Nolte and Nolte

[57] ABSTRACT

A movable diaphragm liquid flow control valve in which a retaining member is disposed in the housing upstream of the diaphragm so that when a back-flow occurs the diaphragm is prevented from blowing back along the pipework, within which the valve is disposed, and is guided to prevent it from tilting.

4 Claims, 7 Drawing Figures

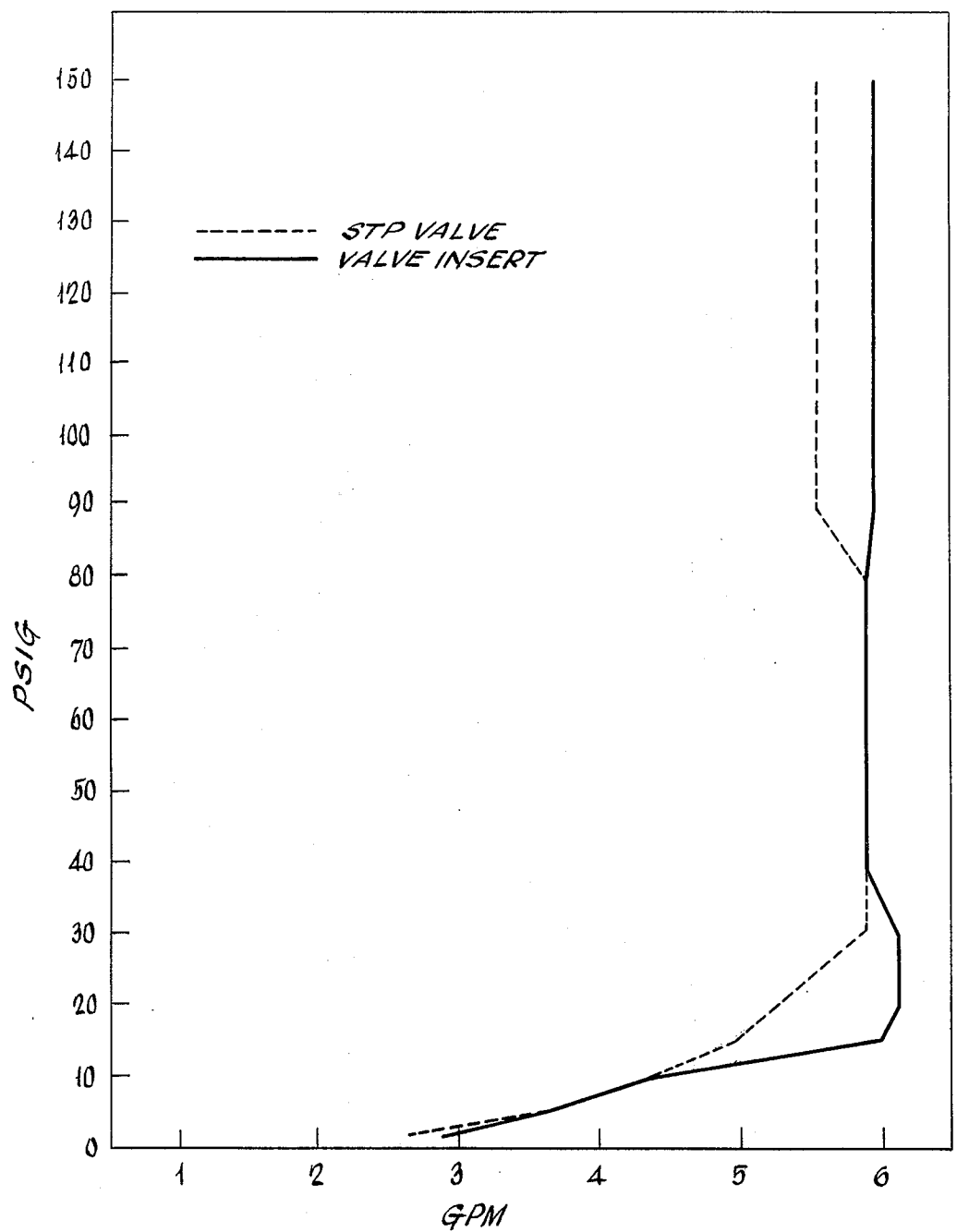

INSERT FOR MOVABLE DIAPHRAGM TYPE FLOW CONTROL VALVE

This is a continuation of application Ser. No. 359,811 filed May 14, 1973, now abandoned.

This invention is concerned with liquid flow control valves of the movable diaphragm type. This type of valve bascially comprises a housing within which is disposed an element defining a valve seat and a diaphragm which, by cooperation with the seat, controls flow through the valve. A typical valve of the kind with which the present invention is concerned is that available from the Hays Manufacturing Division of Erie Pennsylvania and identified as the Hays Mesurflo valve.

Conventionally, a circular section, steel snap ring is disposed in the housing upstream of the diaphragm to retain the diaphragm in position; but it can be observed in applications where the valve is subject to a back-flow that the diaphragm will be blown past the snap ring or will tilt and will inhibit flow when normal flow operation is restored. The primary cause of this is that, to ensure adequate flow through the valve, the internal diameter of the snap ring must be too great to prevent the diaphragm from being blown back through the pipework upon reversal of flow.

It is an object of this invention to provide a valve of a movable diaphragm flow control type in which the diaphragm is positively prevented from being blown back through the pipework when a back pressure occurs and yet will not unduly hinder normal flow through the valve. Additionally, it is an object of this invention to provide a valve in which tilting of the diaphragm is avoided so that the diaphragm will always move in a substantially axial path.

The invention is described in further detail with reference to the accompanying drawings in which:

FIG. 7 is a chart showing the performances of the valve of the prior art as compared with that according to the invention.

Figure 1:
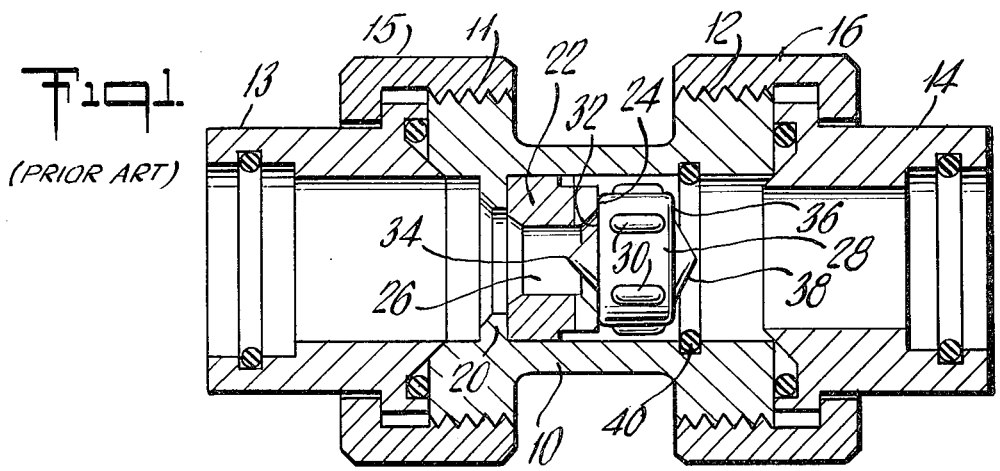
FIG. 1 is a central, longitudinal cross section through a valve of the prior art.

The prior art valve of FIG. 1 comprises a housing 10 having at its downstream and upstream ends, respectively, externally threaded flanges 11 and 12 by which it is connected to pipework 13 and 14 by unions 15 and 16.

A radial flange 20 is formed interiorly of the housing and forms an abutment against which seat element 22 is supported. The seat has a notched face 24 for cooperation with the diaphragm in a manner described hereinafter and a central through passage 26. The diaphragm is a rubber body 28 of generally cylindrical form and having rounded projections 30 spacedly disposed around its sides. Projecting from the downstream face 32 of the diaphragm is a generally conical protrusion 34 and from the upstream side face 36 of the diaphragm a generally conical protrusion 38 extends. The protrusions serve to stabilize flow through the valve. As is known from the aforementioned Hayes Measurflow valve the shape of the diaphragm varies with pressure variations to modify flow past the notched seat.

Disposed upstream of the diaphragm is a steel, circular cross section, snap ring 40 in an appropriate groove in the interior surface of the housing and the internal diameter of the snap ring is kept to a maximum so as not to impede liquid flow between that inner diameter and the cylindrical wall of the body 28 of the diaphragm.

When the device of FIG. 1 is subject to a back-flow, often the diaphragm will be blown back past the snap ring 40 and into pipework 14 or will be titled about its axis so that when normal flow is re-established that flow would be hindered. There are several application in which the valve is subject to such back-flow, for example, in the various pipes associated with a liquid ring compressor.

Figure 2:
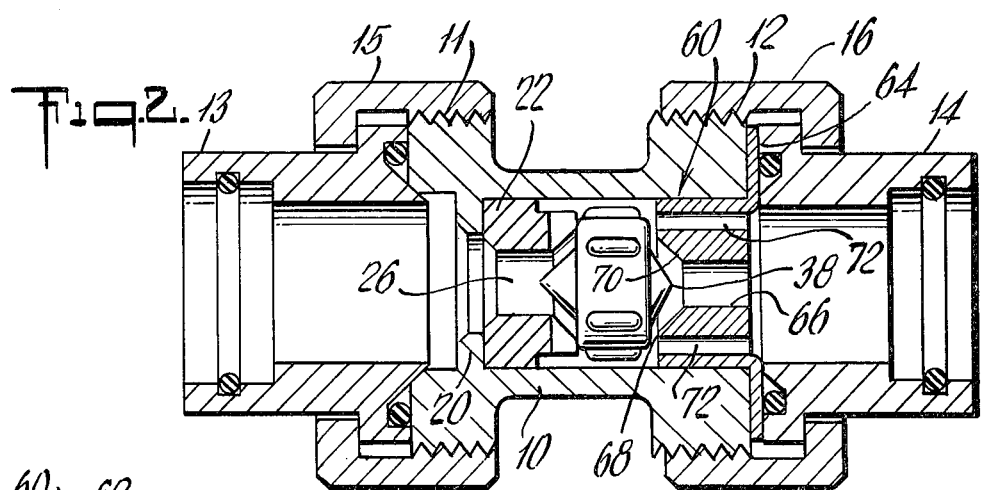
FIG. 2 is a central, longitudinal section through a valve according to this invention.

The valve in FIG. 2 is that of FIG. 1 modified in accordance with the present invention and for easy cross-like reference like parts in the two figures are identified by like reference numerals. The difference between the two valves is that instead of the snap ring 38 of FIG. 1 there is provided in this valve a retaining element 60. The retaining element has a generally cylindrical body 62 closely fitting the internal wall of the body 10 of the valve and a radial flange 64 which overlies the face of flange 12 of body 10 and is trapped between the face and the pipe element 14 by means of union 16.

The retainer element has a through passage 66 formed centrally therein and in face 68 has a frustoconical surface 70 which serves to guide the conical protrusion 38 of the diaphragm when that diaphragm is moved to the right as viewed in the figure so that the diaphragm is constrained to move axially.

Figure 3:
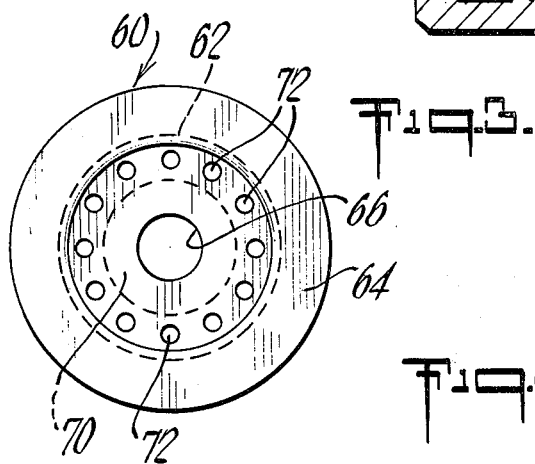
FIG. 3 is an end view from the upstream side of the retaining element of the valve of FIG. 2.

Extending parallel to the axis of the valve and through the body of the retainer element are holes 72 which are arranged in a circular array as can be seen in FIG. 3. The holes 72 are preferably countersunk at their upstream ends. If the holes are not countersunk and the pipe end or union is butted against the upstream face of the insert it will be appreciated that the flow to the holes may be partially restricted.

It will be appreciated that with the construction of FIG. 2 it is impossible for the diaphragm to be blown back into the pipe work 14.

Figure 4:
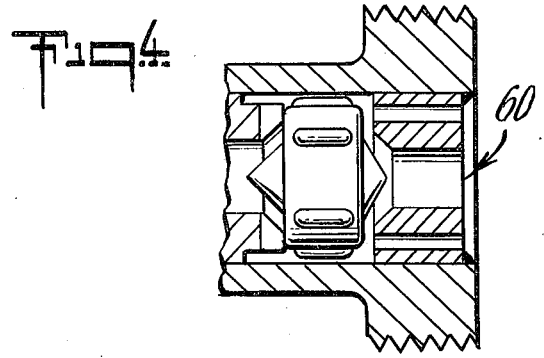
FIGS. 4, 5 and 6 show alternative arrangements for securing the retaining element in the valves of different types.
Figure 5:
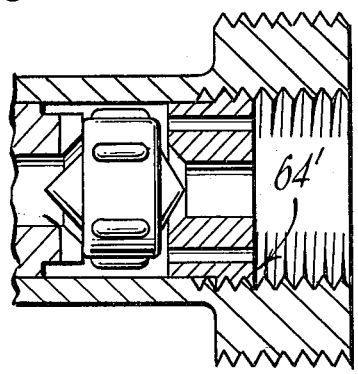
Figure 6:
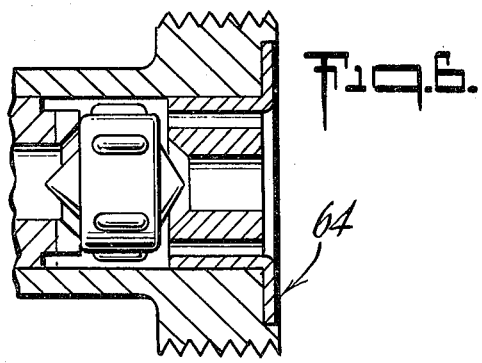

FIGS. 4, 5 and 6 illustrate alternative forms of the retaining element of the embodiment of FIG. 2 adapted to be held in position by means other than the flange 64 and the union 16 of FIG. 2. The retaining element in FIG. 4 is formed without the flange 64 of the element of FIG. 2 and is press fitted into the body of the valve or secured therein by an adhesive. The retaining element of FIG. 5 is externally threaded as at 64' to be screwed into a body adapted to receive the threaded end of the pipe work. In FIG. 6 the right hand end of the valve body is recessed so that flange 64 of the retaining element is contained within the recess.

The through holes 72 present a flow area greater than that available with the center hole only thus reducing the insertion loss of the valve. Additionally, the array of holes acts as a flow straightener to reduce turbulance and resulting in the flow being more accurately metered over a wider range. In tests it has been found that good results are obtained if the total area of the holes is about 43 percent of the cross sectional area of the flow immediately preceding the retaining element. Generally the total area of the holes is made to be as large as possible without overly weakening the retaining element.

FIG. 7 of the drawings is a chart of the pressure in pounds per square inch plotted against the flow rate in gallons per minute for the two different valves and in that Figure the plot of the standard valve operation is shown in chain line and that of the valve according to this invention is shown in full line. It will be noted from that Figure that the flow through the valve according to this invention is always as good with the valve of this invention as the flow through the prior art valve but, of course, the valve of the present invention has the advantage that it can withstand reversals of flow through it without the diaphragm being blown back into the pipework which would normally be upstream of it or tilting to hinder the flow when normal flow current is established.

While in the embodiment of the invention illustrated in the drawings there is shown a valve with but a single diaphragm, it will readily be appreciated that valves incorporating more than one diaphragm and seat (for example three) may embody this invention.

What is claimed is:

1. A flow control valve comprising a housing, a flow path through the housing, a fixed seat disposed in the flow path and defining a central flow aperture, a flexible diaphragm element disposed in the housing and upstream of the seat relatively to normal flow through the valve, said diaphragm being deformable to modify flow through said flow aperture, retention means secured upstream of said diaphragm element and constituting means preventing the movement of said diaphragm element therepast upon the occurrence of a back flow through the valve, said retention means comprising a central flow passage and a plurality of flow passages disposed radially outwardly of said central flow passage, the plurality of flow passages constituting means for straightening flow to reduce turbulence while allowing substantially unimpeded normal flow through the valve.

2. A valve as claimed in claim 1 wherein said plurality of flow passages are disposed in a circular array.

3. A flow control valve as claimed in claim 1 wherin said diaphragm has a conical protrusion on its upstream side and said retaining element has a central opening into which said protrusion moves upon a reversal of flow, the surfaces of said retaining element defining said opening constituting means preventing tilting of said diaphragm.

4. A valve as claimed in claim 1 in which said protrusion is of conical form and the immediately adjacent part of said central passage of said retaining element is defined by correspondingly conical lead surfaces.

* * * * *